Sept. 28, 1965     W. ANGELE     3,209,187
PRINTED ARMATURE DEVICE
Filed May 12, 1961     2 Sheets-Sheet 1

INVENTOR.
WILHELM ANGELE
BY
Charles A. Phillips
ATTORNEYS

Sept. 28, 1965          W. ANGELE                3,209,187
                   PRINTED ARMATURE DEVICE
Filed May 12, 1961                          2 Sheets-Sheet 2

INVENTOR.
WILHELM ANGELE
BY
Charles A. Phillips
ATTORNEYS

United States Patent Office 3,209,187
Patented Sept. 28, 1965

3,209,187
PRINTED ARMATURE DEVICE
Wilhelm Angele, 2702 Scenic Drive SE., Huntsville, Ala.
Filed May 12, 1961, Ser. No. 109,788
3 Claims. (Cl. 310—266)
(Granted under Title 35, U.S. Code (1952), sec. 266)

The invention described herein may be manufactured and used by or for the Government of the United States of America for governmental purposes without the payment of any royalties thereon or therefor.

This invention relates to rotary electromechanical energy converters and particularly to electrical motors and generators, and armatures therefor.

In general, electrical armatures for electromechanical converters or transducers, particularly for motors and generators, consist of a series of coils wound on heavy iron cores. The coils are either hand wound, requiring considerable time, or machine wound by extremely complex equipment. There are many disadvantages to the conventional armatures. A principal one is that they provide considerable inertia making them unsatisfactory or unsuitable for many uses, particularly in servocontrol motors where a fast reaction time is required as in many airplane and missile applications.

While special types of electromechanical converters have been developed to reduce inertia they suffer from either complexity of manufacture, limited application such as drag cup armature types limited to alternating current, or certain other deficiencies which limit their acceptance. One type of relatively low inertia motor which may be used for both A.C. and D.C. application is the disc armature motor (see patent to R. L. Swiggett, No. 2,970,238). As far as is known this type of motor has had quite limited use, one being in early electrical wattmeters. Several problems must be faced in the extension of use of it. First, if any appreciable power is to be obtained, the diameter must be quite large and this in turn increases the inertia as a function of the square of the radius. Second, the disc type tends to warp with any appreciable heat, and third, because of this warpage, large air gaps must be maintained between the disc armature and stator field pole pieces with attendant losses in flux and thus torque.

It is an object of the present invention to provide an armature that has extremely low inertia.

Another object is to provide an armature that can be manufactured in mass production and which requires no hand winding or utilization of complicated machine winding equipment.

Still another object of the invention is to provide an electromechanical converter with a lightweight armature which is resistant to warping and deformation with changes in temperature.

Still another object of the invention is to provide an improved D.C. motor particularly suited for control purposes.

In accordance with the present invention an armature is constructed of a thin rigid hollow cylinder of insulating material and armature windings, electrical conductors interconnected in an electrical armature mode, are photoetched, printed, or plated on the cylinder; and, where employed, commutator bars or slip rings are likewise formed in this manner on the cylinder. In fact, as a particular feature of this invention, an extension of the windings proper forms the commutator. As contemplated by the inventor the armature would include no or substantially no ferrous material and the volume of the armature would largely consist of current carrying conductors.

In the construction of one embodiment of the invention, conductors would be formed on the inner and outer surfaces of a thin cylinder and interconnected by lap windings or other armature winding patterns, configurations or modes. It has been found that one way to construct such an armature is to copperplate a thin blank hollow cylinder of an insulating plastic material such as epoxy, photoprint on the plated cylinder the desired winding pattern, and then etch excess copper away to leave only the windings.

A second method of construction would be to employ a removable cylindrical core and electroplate on this core a winding diagram of conductive metal. Next a thin cylindrical layer of rigid plastic would be added over the first winding diagram and on this plastic layer a second diagram would be plated. After this, the core would be removed, leaving the conductors as the substantial portion of a hollow cylinder. Appropriate connections between layers would be made by plating or rivetting through holes made between layers of conductors or by soldering or plating over the end edges of the plastic cylinder. Axial support for rotation of the cylinder formed in this fashion would be provided by attaching a base portion at one end of the cylinder and centrally attaching a shaft to this base.

As further embodiments of the present invention electromechanical converters such as motors and generators may be constructed employing the cylindrical armature outlined above. One particularly advantageous form of the invention would be in an improved bidirectional direct current motor which would combine with the printed armature a split stator field which would be substantially totally cut by windings of the armature. This combination provides an excellent low inertia control motor with high efficiency and low response time.

The features of my invention which are believed to be novel are set forth with particularity in the appended claims. However, the invention together with further objects, features and advantages may be best understood by reference to the following description considered in conjunction with the accompanying drawings in which:

Figure 1:
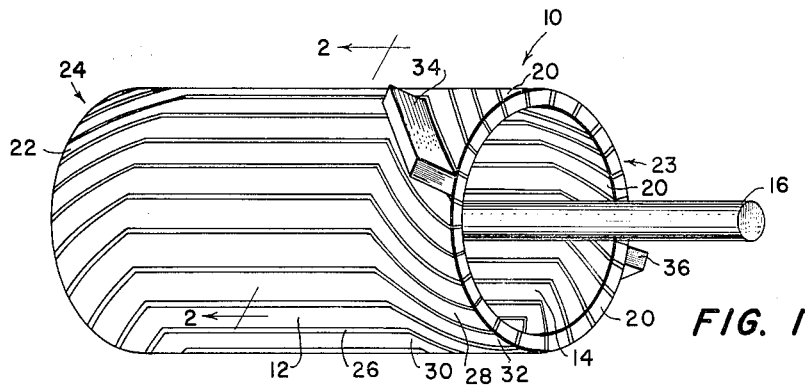
FIGURE 1 is a perspective view of an armature constructed in accordance with the invention.
Figure 3:
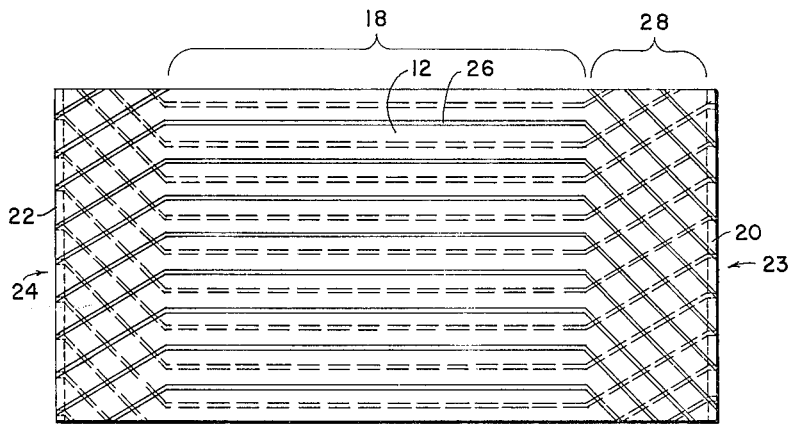
FIGURE 3 is a diagrammatic plan view showing a portion of the armature of FIGURES 1 and 2 laid flat.
Figure 2:
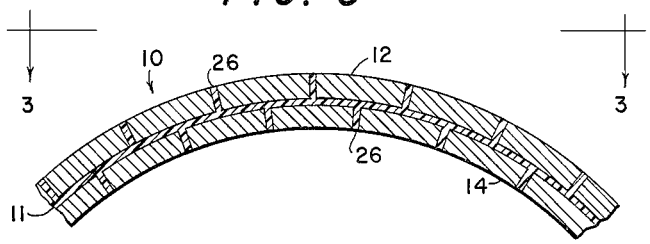
FIGURE 2 shows an enlarged cross-sectional view along the line 2—2 of FIGURE 1.

Referring now to FIGURES 1–3, cylindrical armature 10 substantially consists of a thin hollow insulating cylindrical base 11 upon which there is mounted an outer layer of substantially rectangular cross-section (a slight surface curvature will normally be provided to conform to the cylindrical surface of armature 10) electrical conductors 12 and an inner layer of like conductors 14 overlapping the outer conductors 12 (see FIG. 2) which are interconnected to form a conventional configuration of lap armature winding. The hollow cylinder formed by base 11 and conductors 12 and 14 is supported by a mounting shaft 16, through means of a base 66 shown in FIGURES 4 and 5, which is attached to rotatably support armature 10 about the axis of the armature. Conductors 12, which are parallel, extend near parallel to the armature axis (a slight angular departure or skew from parallel is conventional and would normally be employed) for a substantial axial length in the torque producing midpoint region 18 of armature 10 extending longitudinally over most of the axial length of the armature. Conductors 14 extend similarly on the inner side of the armature. These conductors may be formed as previously indicated, by printed circuit techniques in which, for example, cylindrical base 11 of epoxy would be conductively coated all over to the desired conductor thickness and undesired conductive material etched away; or by initially coating the epoxy cylinder with a very thin conductive base material and upon this base depositing by known plating techniques the full desired thickness of the conductors. As illustrated in FIGURE 2, the conductors, which have a radial dimension small with respect to their circumferential dimension (thus are substantially rectangular), make up the substantial portion of the hollow cylinder forming the armature. Adhesive fills 26 of insulating material such as thin layers of epoxy glue, join adjacent conductors 12 and similarly join adjacent conductors 14. Insulating base 11, in the form of a hollow cylinder, and adhesive fills 26 serve not only to insulate the overlapping conductors which form the windings, but also serve to separate and rigidly hold the conductors to a cylindrical configuration or contour.

At the right end 23 of armature 10 (FIGURE 1) a set of end connector conductors 20 interconnect the inner and outer surface portions of conductors 12 and 14 which lie in midpoint region 18. Similarly, a set of end connector conductors 22 interconnect the region of the inner and outer surface portions of conductors 12 and 14 at the other end 24 of armature 10. The interconnections, which produce a lap type armature winding, are further illustrated by the flat or unrolled view of a portion of armature 10 in FIGURE 3. As illustrated they extend over the axial end of cylindrical base 11. Another technique of interconnection would be to plate through holes in base 11 between conductors 12 and 14.

A commutator zone 28 around the armature extends longitudinally from point 30 to point 32 and covers most of the outer surface region of end connector conductors 20. It is coated with an abrasive resistant and highly conductive material such as rhodium. Electrical brushes 34 and 36 of carbon or other brush material, illustrated diametrically opposite and touching the commutator zone, produce a rubbing contact as the armature and thus the commutator zone rotate. They are oriented at the same angle with respect to the axis of armature 10 as the segments of the commutator zone 28 and thus full surface contact is achieved between the brushes and each commutator segment for an instant as the armature turns.

It is to be understood that armature parameters may vary from those illustrated and accordingly the thickness of the armature, the number and size of conductors in the armature, as a whole, and in each coil, may be adjusted in accordance with the voltage to be applied and the desired torque. As an example, while single turn coils are shown in the lap winding illustrated they may be multiple turn coils as where the operating voltage is to be higher. The salient feature is that most of the cross-section of the armature comprises current carrying and thus working conductors and yet a rigid stable configuration is retained since the conductors, being predominant in volume and conventionally a metal, are substantially the greater support.

Figure 4:
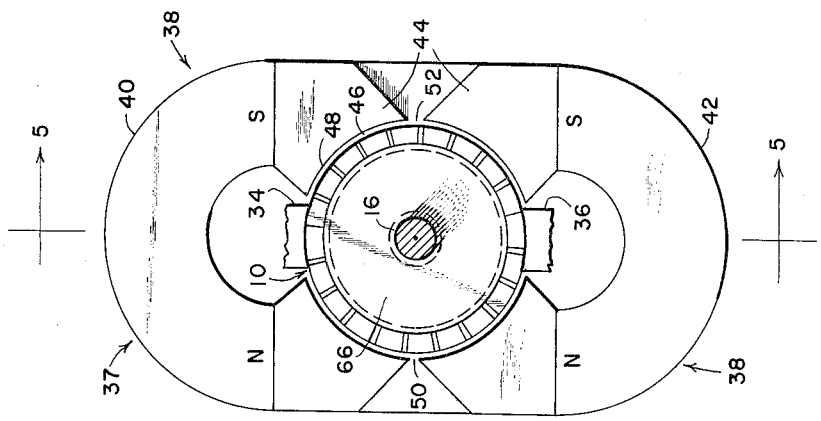
FIGURE 4 shows an end view of an embodiment of a motor constructed in accordance with the invention.
Figure 5:
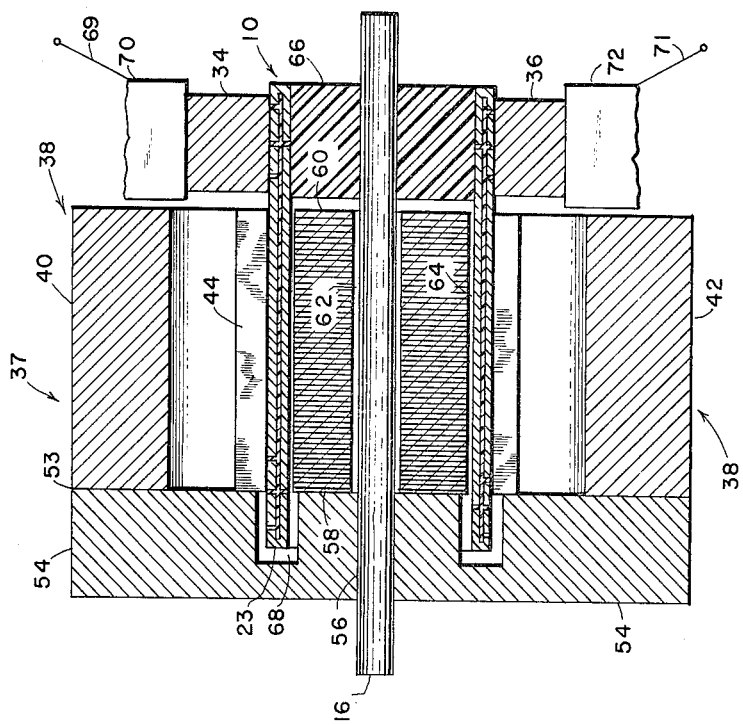
FIGURE 5 shows a cross-sectional view along the line 5—5 of FIGURE 4.

FIGURES 4 and 5 illustrate the construction of an improved electromechanical transducer, particularly intended for direct current motor applications. The stator 37 of the transducer, or motor, as it will be referred to hereinafter, employs a split permanent (or electro) magnetic field 38 consisting of a first magnet 40 and a second magnet 42 each having a pair of magnetic poles. Pole pieces or shoes 44 of laminated paramagnetic material, such as soft iron, extend between each pole of each magnet and a small annular gap 46 around armature 10 and thus shoes 44 effectively extend the magnetic poles to this annular gap. A pole face portion 48 of each pole shoe is curved to conform to the outer circular curvature of annular gap 46. The effective north poles of magnets 40 and 42 are separated by a small gap 50 and the effective south poles are similarly separated by a small gap 52. These gaps are centered on a line bisecting the armature and thus the effective magnetic poles of magnet 40 are separated by substantially a first half cylindrical segment of cylindrical armature 10 (described above with references to FIGURES 1–3), forming the rotor of the motor, and the effective poles of magnet 42 are similarly substantially separated by the other half segment of armature 10. With this configuration, the magnetic poles of both magnets are positioned to produce flux through the armature or rotor in the same direction as would be the case with a single magnetic structure. However, due to the split field which is obtained by the dual magnetic construction employed here, field distortion which would otherwise arise (in the single field case) due to armature induced fields is avoided. This in turn makes possible an optimum fixed position for the brushes for bidirectional armature rotation which reduces brush arcing to a negligible quantity. The diameter of the armature should be sufficient to extend diametrically at least to the edge of the significant stator flux field boundary in order that armature windings cut substantially all of the field.

Magnets 40 and 42 are held in any conventional manner (not illustrated) at a surface 53 by mounting or supporting frame 54 constructed of a diamagnetic material such as aluminum or brass. Mounting frame 54 also supports, by means of a conventional circular bearing surface 56 (not illustrated in detail), armature mounting shaft 16. In addition frame 54 supports by a fixed mounting at surface 58 (the manner of connection, bolting, etc., not being shown) a laminated paramagnetic core 60 filling the cavity between shaft 16 and armature 10 except for a small annular gap 62 between core 60 and shaft 16 and a small annular gap 64 between core 60 and armature 10. Core 60 may be split to provide a gap in line with gaps 50 and 52 to preserve the separation of fields in the flux path between gaps 62 and 64 and thus enhance the split field effect. One end of armature 10 is rigidly mounted on a circular base 66 of insulating material or a base which otherwise provides insulation between armature windings. Shaft 16 supports base 66 by means of a center hole in base 66 in which shaft 16 is inserted and rigidly affixed as by means of an adhesive. Annular slot 68 in mounting frame 54 serves to provide a recess for clearance for the unmounted end 23 of armature 10. The armature, and thus the motor, is powered by energizing the armature electrically, through electrical cables 69 and 71 electrically attached, respectively, to brushes 34 and 36 held by brush holders 70 and 72, respectively, shown partially. Brush holders 70 and 72 would be conventionally mounted as by an insulating type support (not shown) attached to any stationary portion of the motor such as frame 54 or magnets 40 or 42. By orienting the brushes to conform to the angle of the end connector conductors, as best shown in FIGURE 1, a greater brush contact area is very simply and effectively provided.

In operation a direct current voltage is impressed across cables 69 and 71 which energizes the windings of armature 10. The resulting field reacting with the stator field produces torque which thereby causes the motor armature to turn in a direction dependent upon the polarity of connection. With the very high ratio of conductor to other mass of the armature the motor has very little inertia. It thus starts quickly and can be stopped and reversed quickly.

As explained above, by the use of the split field arrangement, there is little distortion of the flux field and thus negligible brush arcing occurs regardless of the polarity of applied voltage or direction of rotation. The cylindrical construction is inherently strong and resists warpage with fairly substantial changes in temperature. Accordingly, gaps 62 and 64 between armature 10 and magnetic pole pieces 44 and core 60 may be made quite small. This in turn reduces magnetic losses and provides increased torque for a given magnitude of applied magnetic field.

It will be appreciated that variations in winding patterns, materials, stator configurations and other changes may be made without departing from the spirit of the invention and that the invention includes all such modifications as come within the scope of the following claims.

What is claimed is:

1. An electromechanical converter comprising a stator, a rotor and a stationary core, said stator comprising means for providing at least one pair of magnetic poles separated by said rotor, said rotor comprising a substantially nonferrous cylinder which is substantially hollow, said cylinder comprising a plurality of overlapping printed circuit electrical conductors positioned and interconnected in an electrical armature mode, and said cylinder further comprising an insulating material positioned in space between said conductors to provide adjacent conductor support, said electrical conductors comprising the substantially greater portion and support of said cylinder and means attached to said cylinder for rotatably supporting said cylinder about the symmetrical axis of said cylinder for rotation about said stationary core.

2. An electrical motor comprising a stator, a substantially hollow cylindrical rotor, and a stationary core, said stator including a diamagnetic supporting frame, a first and second pair of magnetic poles, said first pair of poles being separated by substantially a first half cylindrical segment of said cylindrical rotor and said second pair of magnetic poles being separated by substantially the remaining half cylindrical segment of said cylindrical rotor, said first and second pairs of magnetic poles being poled to produce flux in the same direction and being positioned with a small air gap between like poles, said cylindrical rotor being an electrical armature and includes a substantially rigid nonferrous hollow cylinder formed by a plurality of offset overlapping printed circuit electrical conductors interconnected in an electrical armature mode and rigid insulating material providing adjacent conductor support, and means for rotatably supporting said hollow cylinder about its cylindrical axis, and wherein said conductors are substantially rectangular and providing the substantially greater portion of the rigidity or support of said hollow cylinder and extend substantially parallel to each other and nearly parallel to the axis of said armature for a portion of the axial length of said cylinder, said conductors being arranged in an outer cylindrical layer of conductors and an inner cylindrical layer of conductors overlapping in an offset configuration said outer layer of conductors, said conductors including a first set of end connector conductors interconnecting the ends of corresponding conductors of said outer and inner layers conductors at one end thereof and a second set of end connector conductors innerconnecting the ends of corresponding conductors of said outer and inner layers of conductors at the other end thereof, the outer surface portion of said first set of end connector conductors forming a commutator zone circumferentially around the outer surface of said hollow cylindrical armature, and an abrasive resistant and highly conductive material coated on said commutator zone surface and a pair of electrical brushes positioned diametrically opposite on said commutator zone and making a rubbing contact therewith for supplying power to said conductors, said cylindrical armature being rotatably supported for rotation within the space defined by the stator pole faces and said stationary core.

3. An electrical armature comprising a substantially nonferrous hollow cylinder having a plurality of substantially rectangular printed circuit electrical conductors interconnected in an electrical armature mode; an insulating material separating and providing rigid adjacent conductor support between said conductors; said conductors forming an outer and an inner layer, the conductors in said outer layer overlapping in an offset configuration the conductors in said inner layer, said conductors providing the substantially greater portion and support of said cylinder and extending substantially parallel to each other and at a slight angle to the axis of said cylinder, said conductors having a first set of end connector conductors interconnecting corresponding ends of conductors of said outer and inner layers of conductors at one end of said cylinder and a second set of end connector conductors interconnecting corresponding ends of conductors of said outer and inner layers of conductors at the other end of said cylinder, the outer surface of one of said sets of end connector conductors defining a commutator zone extending circumferentially around the exterior of said hollow cylinder; and an abrasive resistant and highly conductive material coated on the outer surface of said set of end connector conductors defining said commutator zone.

References Cited by the Examiner

UNITED STATES PATENTS

| 1,813,394 | 7/31 | Fraser | 310—266 |
| 2,206,920 | 7/40 | Riggs | 310—266 |
| 2,717,969 | 9/55 | Buchhold et al. | 310—154 |
| 3,102,964 | 9/63 | Bennett et al. | 310—266 |

FOREIGN PATENTS 714,677  9/54  Great Britain.

MILTON O. HIRSHFIELD, *Primary Examiner.*